United States Patent [19]
Ono et al.

[11] Patent Number: 5,225,146
[45] Date of Patent: Jul. 6, 1993

[54] INJECTION OF ELECTRONS WITH PREDOMINANTLY PERPENDICULAR ENERGY INTO AN AREA OF TOROIDAL FIELD RIPPLE IN A TOKAMAK PLASMA TO IMPROVE PLASMA CONFINEMENT

[75] Inventors: Masayuki Ono, Princeton Junction; Harold Furth, Princeton, both of N.J.

[73] Assignee: The United States of America as represented by the United States Department of Energy, Washington, D.C.

[21] Appl. No.: 789,519

[22] Filed: Nov. 8, 1991

[51] Int. Cl.$^5$ .............................................. G21B 1/00
[52] U.S. Cl. ................................... 376/129; 376/133; 376/138
[58] Field of Search ................ 376/121, 129, 133, 138

[56] References Cited

U.S. PATENT DOCUMENTS

| | | | |
|---|---|---|---|
| H757 | 6/1990 | Darrow et al. | 315/111.71 |
| 3,831,101 | 8/1974 | Benford et al. | 376/133 |

OTHER PUBLICATIONS

Taylor et al., "H-Mode Behavior Induced by Cross-Field Currents in a Tokamak", Nov. 20, 1989.

Ono et al., "Electron Ripple Injection for Controlling Tokamak Transport" Nov. 12, 1990.

Choe Et al., "Electron Ripple Injection Experiment in CDX-U" Nov. 4, 1991.

*Primary Examiner*—Donald P. Walsh
*Assistant Examiner*—Frederick H. Voss
*Attorney, Agent, or Firm*—Mark P. Dvorscak; Robert J. Fisher; William R. Moser

[57] ABSTRACT

An electron injection scheme for controlling transport in a tokamak plasma. Electrons with predominantly perpendicular energy are injected into a ripple field region created by a group of localized poloidal field bending magnets. The trapped electrons then grad-B drift vertically toward the plasma interior until they are detrapped, charging the plasma negative. Calculations indicate that the highly perpendicular velocity electrons can remain stable against kinetic instabilities in the regime of interest for tokamak experiments. The penetration distance can be controlled by controlling the "ripple mirror ratio", the energy of the injected electrons, and their $v_\perp/v^{51}$ ratio. In this scheme, the poloidal torque due to the injected radial current is taken by the magnets and not by the plasma. Injection is accomplished by the flat cathode containing an ECH cavity to pump electrons to high $v_\perp$.

9 Claims, 3 Drawing Sheets

INJECTION OF ELECTRONS WITH PREDOMINANTLY PERPENDICULAR ENERGY INTO AN AREA OF TOROIDAL FIELD RIPPLE IN A TOKAMAK PLASMA TO IMPROVE PLASMA CONFINEMENT

CONTRACTUAL ORIGIN OF THE INVENTION

U.S. Government has rights in this invention pursuant to Contract No. DE-AC02-76CH03073 between the U.S. Department of Energy and Princeton University.

BACKGROUND OF THE INVENTION

The present invention relates generally to a method for increasing energy confinement and controlling transport in the plasma of a tokamak. More particularly, the present invention relates to a method of creating and sustaining a radial electric field throughout a substantial portion of the cross-section of the plasma by injecting electrons from an external source into the plasma.

The apparatus for toroidal magnetic confinement that is most popular in controlled fusion research today is the tokamak device. To date, the experiments that have been performed with tokamaks to create high temperature plasmas have been of short duration. The duration and energy confinement of the tokamak plasma must be increased to produce useful amounts of energy with this device. A radial electric field within the plasma of a tokamak has been experimentally shown to increase energy and particle confinement. Theoretical work has been the basis of the proposition that radial electric fields can reduce particle and energy loss from tokamak plasmas. Experimental results reported by Oren et al, J. of Nuclear Materials 111 & 112, 34, (1982) demonstrated that overall confinement time would increase by a factor of 10 when a radial electric field was created in the plasma of a tokamak by a cold cathode or a tungsten filament. Particle and energy confinement are known to be closely related. The radial electric field that was created in the plasma by this method was of significant magnitude only at the extreme edges of the plasma. A problem which arises from longer duration plasmas is the accumulation of impurities and if fusion is occurring, fusion waste products such as helium ash. Impurity accumulation within the plasma was demonstrated by Oren et al. when a negative potential was induced within the plasma. The accumulation approached a constant value as the radial electric field decreased.

M. Ono et al., Phys. Rev. Letters 60, 294 (1988) reported improvements in both energy and particle confinement times associated with radial electric fields produced by radiofrequency heating of a tokamak plasma. The magnitude of internal turbulence was observed to be greatly reduced in the presence of the radial electric field, and energy confinement times improved by 30%.

Itoh and Itoh, Phys. Rev. Letters 60, 2276 (1988) and Shaing et al., Comments Plasma Phys. Controlled Fusion 12, 69 (1988) present theories which claim that radial electric fields will influence the transport of particles in tokamak plasmas and will thus affect confinement of both particles and energy. The method postulated is that a resonant interaction between the magnetic structure and particles of a particular velocity causes rapid transport of those particles to the edge of the plasma. The application of a radial electric field shifts the resonant velocity from one that many particles possess to one shared by only a few. Hence, only a few particles then participate in transport. In particular, Shaing et al. suggest that producing a negative radial electric field will reduce transport and improve confinement.

Recent work by R. J. Taylor et al., Phys. Rev. Letters, 63, 2365 (1989) suggest that radial electric fields in tokamak plasmas can have a substantial beneficial effect upon energy and particle confinement. In particular, Taylor et. al's biasing of the plasma center negative with respect to the wall seemed to reproduce many features of the "H-mode" regime of plasma confinement. This was demonstrated by inserting a material electrode into a tokamak plasma and applying a negative bias. For higher temperature plasmas, experimentation with radial electric fields would require a non-invasive biasing technique.

The transition of a plasma into the H-mode is marked by a sudden decrease in the hydrogenic light emission from the plasma edge, followed by a prolonged increase in the plasma density. The reduction of hydrogen light ($H_\alpha$ or $H_\beta$) indicates that the incoming neutral particle flux is reduced, presumably because of a decrease of the outgoing plasma flux, leading to a reduction in "recycling." The improvement in the energy confinement is generally less than the increase in particle confinement. H-mode measurements also reveal the formation of sharp density and temperature gradients inside the last closed magnetic surfaces, which represents a transport barrier. Despite the magnitude of the effort aimed at modeling the H-mode, no clear mechanism has been identified, although radial electric fields are thought to play a role.

Accordingly, it is an object of the present invention to provide a method and apparatus for controlling transport in a tokamak plasma.

Another object of the present invention is to provide a method and apparatus for stabilizing highly perpendicular velocity electrons against kinetic instabilities in a tokamak.

A further object of the present invention is to provide a non-invasive biasing technique for creating radial electric fields in a tokamak.

Yet a further object is to provide an arrangement for trapping electrons in the interior of a tokamak plasma and charging it negative with respect to the edge to improve confinement properties.

SUMMARY OF THE INVENTION

This invention includes a method for improving confinement properties of a plasma of a tokamak by providing a ripple field region in the plasma; injecting electrons having predominantly perpendicular energy into the ripple field region for trapping the electrons into the plasma; and, negatively charging the plasma center with respect to the edge by allowing the electrons to grad-B drift vertically toward the plasma interior until they are detrapped, thereby creating a radial electric field at the edge of the plasma. The electrons are injected from an electron source exterior of the plasma. Preferably, the electrons have a perpendicular to parallel energy ratio of greater than 1 and are injected by a flat cathode containing an electro-cyclotron-heating (ECH) cavity. The ripple field is created by poloidal bending magnets locally placed around the torus of the tokamak. The cathode includes a $LaB_6$ electron emitting faceplate.

An electron injector for improving confinement properties of a tokamak plasma includes an external cathode adjacent to the tokamak for emitting electrons into the plasma; means for accelerating the electrons by radiofrequency waves at the electron cyclotron frequency; and a plurality of magnetic coils located around the torus of the tokamak for creating a local magnetic field ripple for trapping the electrons. In this manner, the electrons drift and move toward the interior of the plasma until they are detrapped, thereby creating a radial electric field at the edge of the plasma. The means for accelerating the electrons by radio frequency waves includes an electro cyclotron heating waveguide cavity and an electro cyclotron heating acceleration region adjacent to the cathode. The electrode includes a carbon heater and a $LaB_6$ emitting faceplate.

BRIEF DESCRIPTION OF THE DRAWINGS

The above-mentioned and other features of the invention will become more apparent and be best understood, together with the description, by reference to the accompanying drawings, in which.

DETAILED DESCRIPTION OF THE INVENTION

Figure 1:
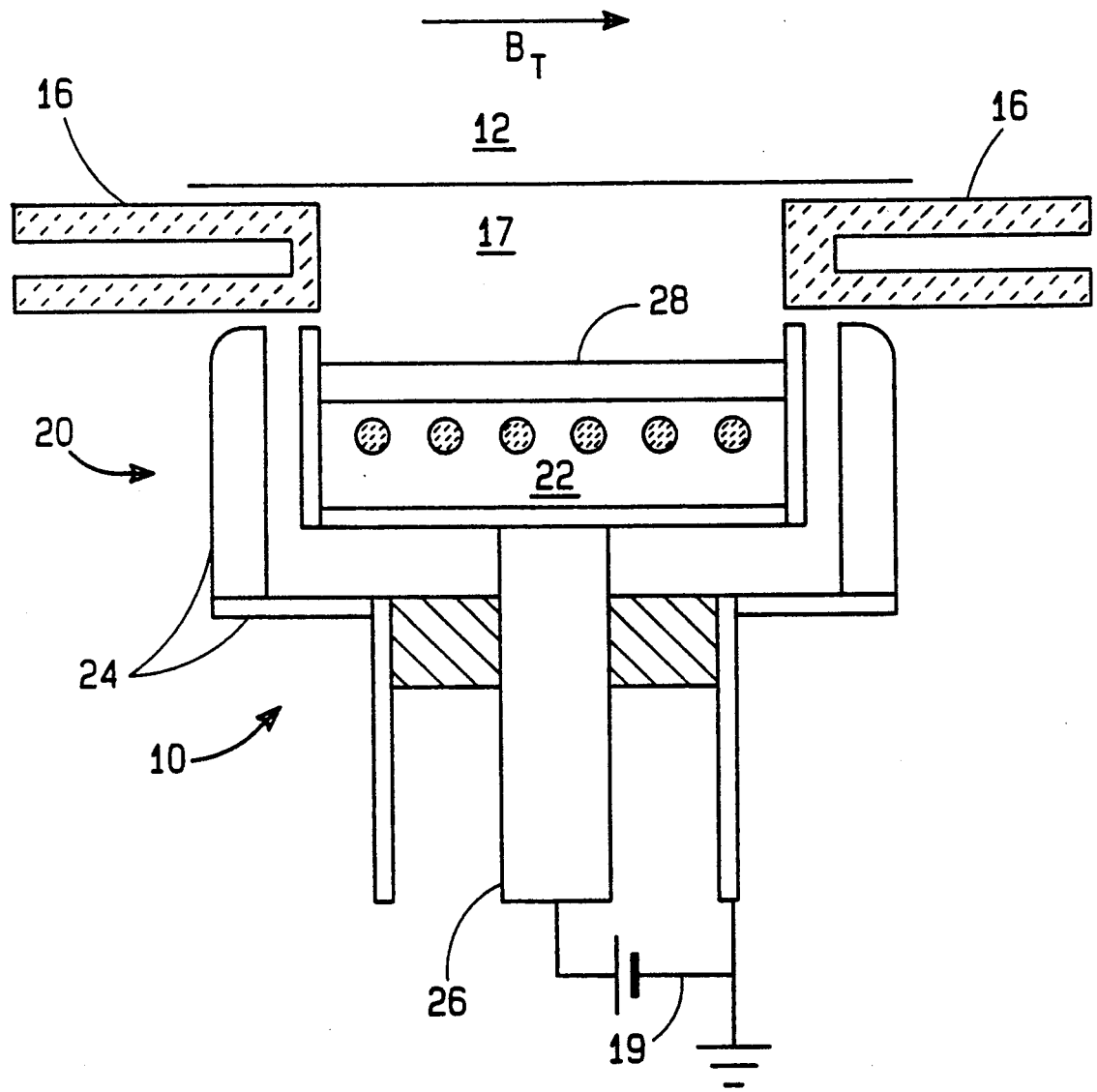
FIG. 1 shows a schematic of an electron injector in accordance with the present invention.
Figure 1A:
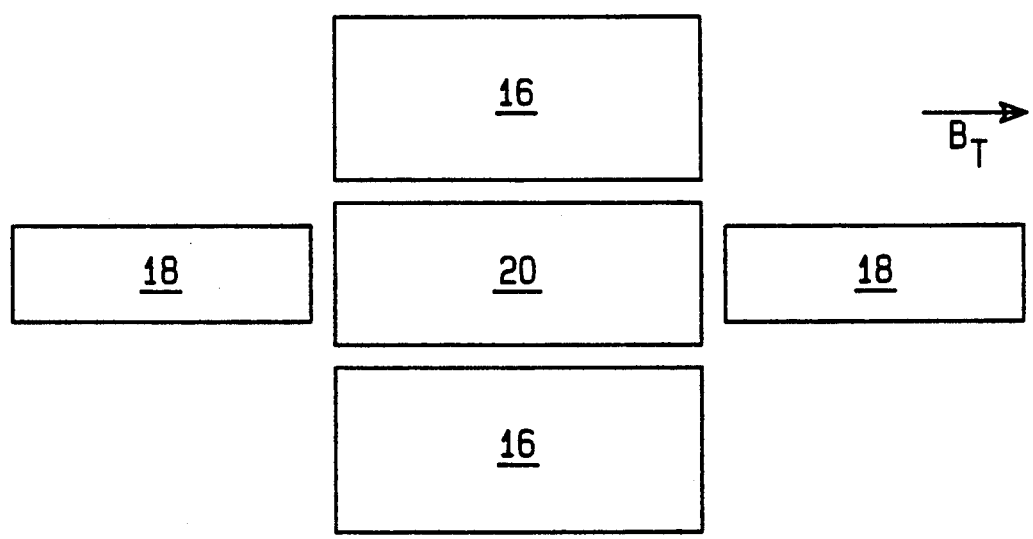
FIG. 1a shows the top view, from the plasma, of the electron injector geometry of FIG. 1; and, FIG. 2 show an exploded view of a panel cathode for the electron injector of FIG. 1.

FIG. 1 illustrates an electron injection scheme for controlling transport in a tokamak plasma. An electron injector 10 is shown external to a tokamak plasma 12. The plasma has a toroidal magnetic field $B_T$. Preferably, the injector 10 is placed where the natural grad-B drift direction is radially inward. This would either be above or below the plasma 12 depending on the direction of $B_T$. For purposes of illustration, FIG. 1 shows the injector 10 below the plasma. Electrons are emitted from a heated cathode 20. An electro cyclotron heating (ECH) waveguide cavity 16 has an acceleration region 17 adjacent to the cathode for accelerating the electrons by radio frequency waves at the electron cyclotron frequency. Referring to FIG. 1a, ripple or bending magnets 18 are locally placed around the torus and provide a ripple field region in the plasma. The cathode 20 is connected to power source 19. The electrons are injected into the plasma and then allowed to drift vertically, by means of the grad-B drift, into the region of field ripple. The field created by the bending magnets is a relatively small perturbation to the magnetic field to cause the electrons to be trapped and drift radially inward into the center of the plasma. This charges the interior of the plasma negative and thereby creates a radial electric field at the edge of the plasma. The arrangement provides a means of biasing large tokamak plasmas without the insertion of material objects, and a way of attaining H-mode regime with substantially lower applied power.

Figure 2:
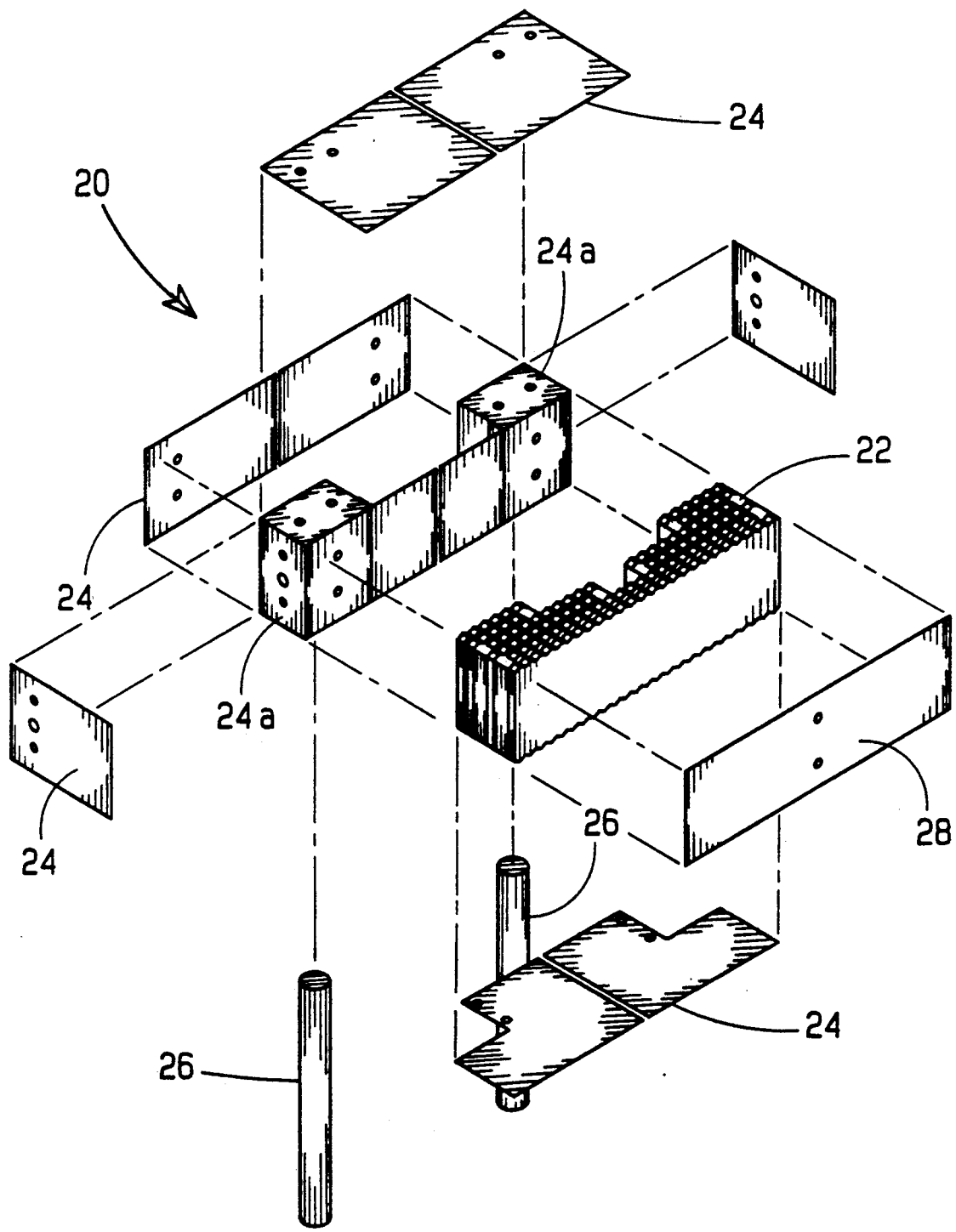

A detailed view of the cathode 20 is illustrated in FIG. 2. The cathode includes a carbon heater 22 surrounded by tantalum shields 24, and inside tantalum shields 24a. The heater and tantalum shields are supported by current feed and support tubes 26. Preferably, the tubes 26 are coaxial copper tubes for supplying a current feed as well as providing for water flow. The carbon heater 22 is also attached at one end to copper mounting blocks 24a. Adjacent to the carbon heater 22 at an end opposite the mounting blocks is an electron emitting faceplate 28 of $LaB_6$ coated on molybdenum or tungsten.

In accordance with the above description, a method for creating a radial field at the edge of a plasma of a tokamak includes providing a ripple field region in the plasma by the localized placement of a plurality of bending or ripple magnets 18 around the torus of the tokamak. Electrons having a predominantly perpendicular energy with respect to the toroidal magnetic field direction $B_T$, are externally or non-invasively injected into the ripple field region and are trapped. The plasma center is negatively charged by allowing the electrons to grad-B drift vertically toward the plasma interior until they are detrapped, thereby creating a radial electric field at the edge of the plasma.

The electron injector 10 described is capable of injecting approximately 20A of electron current with electrons having low KeV energy and a perpendicular to parallel energy ratio ($v_\perp/v_\parallel$) of greater than 1. For trapping the electrons it is also necessary that:

$$v_\perp/v^{51} \geq (2\delta)^{\frac{1}{2}} \tag{1}$$

where $\delta$ is the ripple fraction. As an example, if $v_\perp/v_\parallel$ is $\geq 10$, then the electron becomes detrapped when $\delta \leq 0.005$. A cathode having electro cyclotron heating as described would obtain electrons with $v_\perp/v_\parallel >> 1$.

The radial penetration distance of injected electrons, L, can be controlled by adjusting the injected electron energy:

$$L = V_D/\nu_{eff} = 40E^{2.5}(2\delta)^{0.5}(RBn_e)^{-1} \tag{2}$$

where L is expressed in centimeters (cm); E in KeV; R in meters (m); B in Teslas (T); $n_e$ is ($10^{12}cm^{-3}$), and:

$$\nu_{eff}sec^{-1} = 2.5 \times 10^3 n_e E^{-1.5}(2\delta)^{-0.5} \tag{3}$$

and further:

$$V_D = 10^5 E(RB)^{-1} \tag{4}$$

where $V_D$ is in cm/sec. For a typical tokamak fusion test reactor (TFTR) having parameters of $R \approx 2.7$, $B \approx 5$, $n_e \approx 3$, $\delta \approx 0.02$, and $E=5$, the expected penetration distance, L, is 11 cm.

The required injection current is modest (on the order of 10A), even for large tokamak plasmas. The minimum required injected current is determined by the leakage radial current. Taylor et. al gives an expression of the leakage radial current density from the force balance equation as:

$$J_r B_\phi/c = n_i m_i c E_r/(B_\phi \tau_p) \tag{5}$$

where $\tau_p$ is the momentum damping time which is thought to be of the order of ion-ion collision time (T. H. Stix, Phys. Fluids 16, 1260 (1973)). Integrating equation 5 over the surface, the total radial current obtained is:

$$I_r = 4\pi^2 a R n_i m_i c^2 E_r B_\phi^{-2} \tau_p^{-1} \quad (6)$$

Assuming $\tau_p$ to be the ion-ion collision frequency, one obtains:

$$I_r(A) = 10 a R \mu n_e^2 E_r B_\phi^{-2} T_i^{-1.5} \quad (7)$$

where a is in meters, R is in meters, $n_e$ is $10^{12} \text{cm}^{-3}$, $E_r$ is 100 V/cm, B is in Teslas, and $R_i$ is 10 eV. As an example, in terms of the above units, on the Continuous current Tokamak (CCT) at UCLA, $a=0.3$, $R=1.5$, $\mu=1$, $n_3=1$, $E_r=2$, $B_\phi=0.3$, and $T_i=3$, the radial current is about 20 amperes, which is very close the observed required injected current to maintain the high confinement mode in the CCT. For the TFTR, $a=0.8$, $R=2.7$, $\mu=2.7$, $\mu \leq 2$, $n_3=3$, $E_r=5$, $B_\phi=5$, and $R_i=30$, the radial current is 0.47A, which is relatively small. For CIT (Compact Ignition Takamak) parameters, $a=0.6 \times 1.4$, $R=2.1$, $\mu=2.5$, $n_3=20$, $E_r=5$, $B_\phi=11$, and $T_i=30$, and the $I_r=4.4A$, which is still quite small. Thus, the CIT plasma can be induced to go into the high mode with less than 100 KW of injected power.

There has thus been shown na electron injection scheme for controlling transport in a tokamak plasma. Electrons with predominantly perpendicular energy are injected into a ripple field region created by a group of localized poloidal field bending magnets. The trapped electrons then grad-B drift vertically toward the plasma interior until they are detrapped, charging the plasma negative. Calculations indicate that the highly perpendicular velocity electrons can remain stable against kinetic instabilities int he regime of interest for takamak experiments. The penetration distance can be controlled by controlling the "ripple mirror ratio", the energy of the injected electrons, and their $v_\perp/v_\parallel$ ratio. In this scheme, the poloidal torque due to the injected radial current is taken by the magnets and not by the plasma. Injection is accomplished by the flat cathode containing an ECH cavity to pump electrons to high $v_\perp$.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined as follows:

1. A method of improving confinement properties of a plasma of a tokamak having a toroidal magnetic field direction comprising:
   (a) providing a ripple field region in the plasma;
   (b) injecting electrons having predominantly perpendicular energy with respect to the toroidal magnetic field direction of the plasma into the ripple field region for trapping the electrons into the plasma; and,
   (c) negatively charging the plasma center with respect to the edge by allowing the electrons to grad-B drift vertically toward the plasma interior until they are detrapped, thereby creating a radial electric field at the edge of the plasma.

2. The method of claim 1 wherein the electrons are injected from an electron source exterior of the plasma.

3. The method of claim 2 wherein the electrons are injected by a flat cathode containing an electrocyclotron-heating cavity.

4. The method of claim 3 wherein the trapping of electrons in the plasma is governed by:

$$v_\perp v_\parallel \geq (2\delta)^{\frac{1}{2}}$$

where $v_\perp/v_\parallel$ is the perpendicular to parallel energy ratio of the electrons, and $\delta$ is the ripple fraction.

5. The method of claim 4 wherein the ripple field is created by poloidal bending magnets locally placed around the torus of the takamak.

6. The method of claim 5 wherein the cathode has an electron emitting faceplate of $LaB_6$.

7. An electron injector for improving confinement properties in a tokamak plasma direction comprising:
   (a) an external cathode adjacent to the tokamak for emitting electrons into the plasma;
   (b) means for accelerating the electrons by radiofrequency waves at the electron cyclotron frequency;
   (c) a plurality of magnetic coils located around the torus of the tokamak creating a local magnetic field ripple for trapping the electrons;
   whereby the electrons drift and move toward the interior of the plasma until they are detrapped, thereby creating a radial electric field at the edge of the plasma.

8. The electron injector of claim 7 wherein the means for accelerating the electrons by radio frequency waves includes an electro cyclotron heating waveguide cavity and an electro cyclotron heating acceleration region adjacent to the cathode.

9. The electron injector of claim 8 wherein the electrode includes a carbon heater and an electron emitting faceplate of $LaB_6$.

* * * * *